(12) United States Patent
Fragnière

(10) Patent No.: US 10,279,914 B2
(45) Date of Patent: May 7, 2019

(54) SEAT BELT ARRANGEMENT AND SEAT ASSEMBLY INCORPORATING SAME

(71) Applicant: AIRBUS OPERATIONS GMBH, Hamburg (DE)

(72) Inventor: Benjamin Fragnière, Hamburg (DE)

(73) Assignee: Airbus Operations GmbH, Hamburg (DE)

( * ) Notice: Subject to any disclaimer, the term of this patent is extended or adjusted under 35 U.S.C. 154(b) by 33 days.

(21) Appl. No.: 14/685,042

(22) Filed: Apr. 13, 2015

(65) Prior Publication Data

US 2015/0291282 A1 Oct. 15, 2015

(30) Foreign Application Priority Data

Apr. 15, 2014 (EP) ..................................... 14164762

(51) Int. Cl.
B64D 11/06 (2006.01)
(52) U.S. Cl.
CPC ........ B64D 11/062 (2014.12); B64D 11/0649 (2014.12); *Y02T 50/46* (2013.01)
(58) Field of Classification Search
CPC .......................... B64D 11/062; B64D 11/0649
USPC ........................................... 244/122 R, 118.6
See application file for complete search history.

(56) References Cited

U.S. PATENT DOCUMENTS

| 2,510,115 | A | * | 6/1950 | Jakosky | ............... | B64D 11/062 139/383 R |
| 2,945,275 | A | * | 7/1960 | Almeter | ................. | B60R 22/18 24/170 |
| 3,653,713 | A | * | 4/1972 | Reason | .................. | B60N 2/242 297/163 |
| 4,114,947 | A | * | 9/1978 | Nelson | ............... | B60N 2/01558 248/503.1 |
| 5,069,505 | A | * | 12/1991 | Amthor | .................. | B64D 11/06 297/216.2 |
| 5,806,910 | A | * | 9/1998 | DeRees | ................ | B60N 2/0284 244/122 R |
| 7,441,823 | B2 | * | 10/2008 | Bertoli | ................. | B60N 2/2809 280/801.1 |

(Continued)

FOREIGN PATENT DOCUMENTS

| EP | 1 247 703 | 10/2002 |
| FR | 2 136 134 | 12/1972 |

(Continued)

OTHER PUBLICATIONS

European Search Report for Application No. 14 16 4762 dated Oct. 1, 2014.

*Primary Examiner* — Brian M O'Hara
*Assistant Examiner* — Keith L Dixon
(74) *Attorney, Agent, or Firm* — Jenkins, Wilson, Taylor & Hunt, P.A.

(57) ABSTRACT

A seat belt arrangement for a seat assembly of an aircraft for securing a passenger in a seat during travel. The seat belt arrangement comprises: a seat belt including at least a first belt portion to extend across a body part of the passenger seated on the seat; and a fastener member provided on the first belt portion, especially at a first end region of the first belt portion, for operation by the passenger to fasten and to release the seat belt across the body part of the passenger. A second end region of the first belt portion is anchored at a footing of the seat assembly or at a floor structure of the aircraft directly.

20 Claims, 2 Drawing Sheets

(56) References Cited

U.S. PATENT DOCUMENTS

| | | | | |
|---|---|---|---|---|
| 7,762,603 | B2* | 7/2010 | Hyde | B60N 2/015 |
| | | | | 248/503.1 |
| 7,862,081 | B2* | 1/2011 | Thomas | B60R 21/207 |
| | | | | 280/730.2 |
| 8,393,680 | B2* | 3/2013 | Zimmermann | B64D 11/0693 |
| | | | | 297/248 |
| 2009/0236828 | A1 | 9/2009 | Foubert et al. | |
| 2014/0232153 | A1* | 8/2014 | Bell | B29C 70/545 |
| | | | | 297/232 |

FOREIGN PATENT DOCUMENTS

| GB | 1 332 741 | 10/1973 |
|---|---|---|
| WO | WO 99/44865 | 9/1999 |

* cited by examiner

SEAT BELT ARRANGEMENT AND SEAT ASSEMBLY INCORPORATING SAME

CROSS-REFERENCE TO RELATED APPLICATION

This application claims priority to EP 14 164 762.8 filed Apr. 15, 2014, the entire disclosure of which is incorporated by reference herein.

TECHNICAL FIELD

The present disclosure relates to a seat belt arrangement for a seat of a vehicle, especially an aircraft or a spacecraft, for securing a passenger in his or her seat during travel. The present disclosure also relates to a seat assembly for a vehicle, especially an aircraft or spacecraft, having such a seat belt arrangement and thus also to a vehicle incorporating such a seat assembly.

BACKGROUND

Although this disclosure is especially designed for use in the aircraft and aerospace industries, it will be appreciated that it may also be employed in nautical and/or automotive applications.

In the aircraft and aerospace industries, the seat assemblies of passenger aircraft are provided with safety belts and are tested to ensure that they satisfy specific requirements or standards of strength and safety. The test procedures require "crash testing" the seat, i.e. rapidly decelerating the seat in accordance with predetermined criteria. One of these tests simulates a scenario in which forces are predominantly in a longitudinal forward direction, with a highest load factor in the forward direction corresponding to sixteen (16) times the gravitational acceleration (i.e. "16 g"). For this 16 g test, the deceleration is from a minimum of 13.4 m/s to 0 m/s in not more than 0.09 seconds and exhibits a peak deceleration of at least 16 g. The seats are tested under conditions that are representative of the aircraft installation.

While design efforts are continually directed to reducing the mass of an aircraft in order to optimize fuel consumption, it nevertheless remains critical that strength and safety of the aircraft structure is not compromised and that the testing standards are still met.

SUMMARY

Against this background, a new and improved seat belt arrangement for a seat assembly of a vehicle, particularly an aircraft, is provided that can satisfy current safety and testing standards yet also enable a lower mass seat assembly construction.

According to one aspect, therefore, the disclosure herein provides a seat belt arrangement for a seat assembly of an aircraft for securing a passenger in a seat during travel, comprising:
 a seat belt including at least a first belt portion for extending across a body part of the passenger seated on the seat; and
 a fastener member provided on the first belt portion, especially at a first end region of the first belt portion, for operation by the passenger to fasten and to release the seat belt across the body part of the passenger;
 wherein a second end region of the first belt portion is anchored at a footing of the seat assembly or at a floor structure of the aircraft directly.

In this way, the disclosure herein provides a seat belt arrangement in which the loads or forces imparted to the seat belt, e.g. during an accident, may be transmitted directly to a footing of the seat frame or to the floor structure itself. As such, other parts of the seat frame are not required to bear and/or transfer the loading on the seat belt during an accident or during the 16 g test. The loading parameters of a frame of the seat assembly are therefore significantly reduced which, in turn, means that the frame of the seat assembly can be built in a lighter-weight configuration without compromising the strength and safety standards required.

In an embodiment, the second end region of the first belt portion extends to the floor structure of the aircraft or to the footing of the seat assembly in contact with the floor structure. Furthermore, the second end region of the first belt portion typically includes an attachment member with which the seat belt is securely fixed or anchored to the footing of the seat assembly or to the floor structure of the aircraft, especially to a seat rail in the floor structure. In this regard, the attachment member is desirably configured to anchor in or fix to a seat rail incorporated in the floor structure of the aircraft.

In a further embodiment, the fastener member provided on the first belt portion is configured to cooperate with a complementary fastener member for fastening and releasing the first belt portion across the body part of the passenger seated on the seat. For example, the fastener member may be one part of a buckle type fastener, such as an insert element (e.g. having a loop or hook), and the complementary fastener member may be another part of the buckle type fastener, such as a latching mechanism or clasp, configured to interlock in a releasable manner with the insert member.

In a further embodiment of the disclosure herein, the seat belt includes a second belt portion which cooperates with the first belt portion for extending across a body part of the passenger seated on the seat. In this embodiment, the complementary fastener member may be provided on the second belt portion, e.g. at a first end region of the second belt portion. In this way, the seat belt may comprise two belt portions which interconnect with one another via the fastener member and complementary fastener member in the nature of a two-point lap belt which extends over a lap of the passenger seated on the seat. A second end region of the second belt portion may be anchored at a footing of the seat assembly or at a floor structure of the aircraft directly, as is the case for the first belt portion. In this regard, the second end region of the second belt portion preferably extends to the footing or to the floor structure of the aircraft. Furthermore, the second end region of the second belt portion may comprise an attachment member with which the seat belt is securely fixed or anchored to the footing of the seat assembly or to the floor structure, especially to a seat rail of the aircraft. Alternatively, however, the second end region of the second belt portion may be anchored to a frame of the seat assembly adjacent the seat.

According to another aspect, the present disclosure provides an aircraft seat assembly for mounting on a floor structure of an aircraft, comprising:
 at least one seat configured to accommodate and support a passenger during travel;
 a frame upon which the at least one seat is mounted and supported, the frame including a footing configured to engage and attach to a floor structure of the aircraft; and
 a seat belt respectively associated with each seat and configured to extend across a body part of the passenger seated on the seat, the seat belt including at least a first belt portion and a fastener member provided on the first belt portion, especially at a first end region of the first belt portion, for operation by the passenger to fasten and to release the seat belt across the body part of the passenger;

wherein a second end region of the first belt portion is anchored at the footing or at the floor structure of the aircraft directly.

In a further embodiment, each seat of the seat assembly includes a seat pan and a back rest which are supported on the frame. The second end region of the first belt portion extends to the floor structure of the aircraft or to the footing of the seat frame in contact with the floor structure. In particular, the second end region of the first belt portion may extend from the seat or seat pan to the floor structure. As noted above, the second end region of the first belt portion may include an attachment member with which the seat belt is securely fixed or anchored to the footing of the seat assembly or to the floor structure of the aircraft, especially to a seat rail in the floor structure.

In another embodiment of the disclosure herein, the seat belt includes a second belt portion which cooperates with the first belt portion to extend across a body part of the passenger seated on the seat. A complementary fastener member may be provided on the second belt portion, especially at a first end region of the second belt portion. In this way, the complementary fastener member may be configured to cooperate with the fastener member to fasten and release the seat belt across the body part of the passenger seated on the seat. For example, a second end region of the second belt portion is anchored at the footing of the frame or at the floor structure of the aircraft directly. In this regard, the second end region of the second belt portion may extend to the footing or to the floor structure, and/or the second end region of the second belt portion may comprise an attachment member with which the seat belt is securely fixed or anchored to the footing or the floor structure, e.g. via a seat rail.

According to a further aspect, the present disclosure provides a vehicle, such as an aircraft or spacecraft, having at least one seat assembly, and preferably several, according to any one of the embodiments described above.

BRIEF DESCRIPTION OF THE DRAWINGS

For a more complete understanding of the present disclosure and the advantages thereof, exemplary embodiments of the disclosure herein are explained in more detail in the following description with reference to the accompanying drawings, in which like reference characters designate like parts and in which.

DETAILED DESCRIPTION

Figure 1:
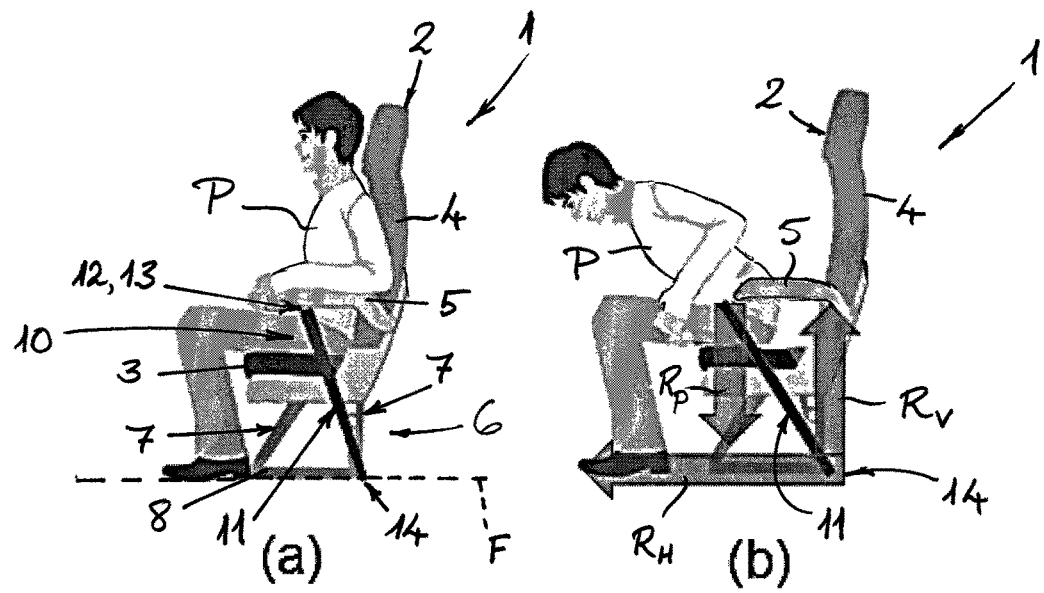
FIG. 1(a) is a schematic side view of a passenger seated on a seat of an aircraft having a seat belt arrangement according to an embodiment of the disclosure herein in a fastened state.
FIG. 1(b) shows forces exerted by the passenger on the seat-belt arrangement of FIG. 1(a) during a 16 g test.

The accompanying drawings are included to provide a further understanding of the present disclosure and are incorporated in and constitute a part of this specification. The drawings illustrate particular embodiments of the disclosure herein and together with the description serve to explain the principles of the disclosure herein. Other embodiments of the disclosure herein and many of the attendant advantages of the disclosure herein will be readily appreciated as they become better understood with reference to the following detailed description.

It will be appreciated that common and well understood elements that may be useful or necessary in a commercially feasible embodiment are not necessarily depicted in order to facilitate a more abstracted view of the embodiments. The elements of the drawings are not necessarily illustrated to scale relative to each other. It will further be appreciated that certain actions and/or steps in an embodiment of a method may be described or depicted in a particular order of occurrences while those skilled in the art will understand that such specificity with respect to sequence is not necessarily required. It will also be understood that the terms and expressions used in the present specification have the ordinary meaning as is accorded to such terms and expressions with respect to their corresponding respective areas of inquiry and study, except where specific meanings have otherwise been set forth herein.

With reference firstly to FIGS. 1(a) and (b) of the drawings, a seat assembly 1 having a seat belt arrangement according to a preferred embodiment of the disclosure herein is illustrated. The seat assembly 1 includes a seat 2 having a seat pan 3, a back rest 4 and arm rests 5 and which accommodates and supports a passenger P during travel. Furthermore, the seat assembly 1 includes a frame 6 upon which the seat 2 is supported, the frame 6 having legs 7 as well as one or more footings 8 which contact and attach to a floor structure F of the aircraft. In addition, the seat assembly 1 comprises a seat belt 10 having at least a first belt portion 11 which extends across a lap of the passenger P seated on the seat 2. A fastener element, such as a buckle insert element 12, is provided at a first end region 13 of the belt portion 11 for operation by the passenger P to releasably fasten the seat belt 10 across his or her lap. A second opposite end region 14 of the seat belt portion 11, on the other hand, extends down towards the floor structure F and is anchored at the footing 8 of the frame 6 or at the floor structure F of the aircraft directly.

With reference to FIG. 1(b), the forces or loads imparted or transferred via the seat belt 10 during a "16 g test" (i.e. as during an accident) are illustrated as arrows $R_H$, $R_V$, and $R_P$. The arrow $R_H$ represents a horizontal reaction force and the arrow $R_V$ represents a vertical reaction force. The arrow $R_P$, on the other hand, represents a passenger reaction force. Because the second end region 14 of the belt portion 11 is anchored at the footing 8 of the frame 6 or at the floor structure F of the aircraft directly, the horizontal reaction force $R_H$ and the vertical reaction force $R_V$ are essentially transferred directly to the floor structure of the aircraft. This is in contrast to the conventional seat belt arrangement shown in FIGS. 2(a) and 2(b).

Figure 2:
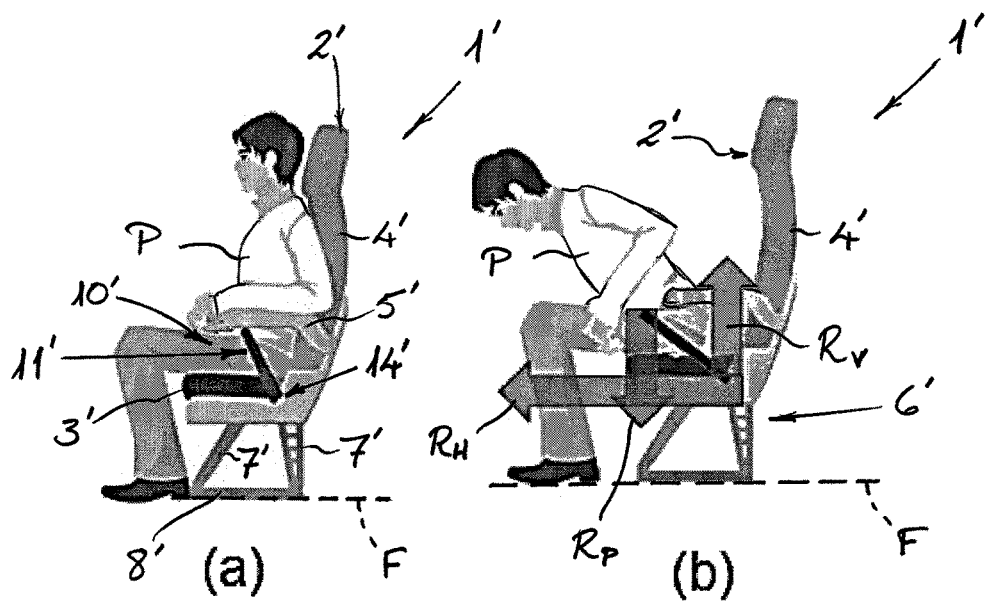
FIG. 2(a) is a schematic side view of a passenger seated on a seat of an aircraft having an exemplary seat belt arrangement in a fastened state.
FIG. 2(b) shows forces exerted by the passenger on the seat-belt arrangement of FIG. 2(a) during a 16 g test.

Referring to FIGS. 2(a) and 2(b), the conventional seat belt arrangement comprises a seat belt 10' having at least a first belt portion 11', an end region 14' of which is anchored to the seat frame 6' adjacent the seat pan 3'. During a 16 g test (and thus during an accident), the forces or loads imparted or transferred via the seat belt 10' are shown in FIG. 2(*b*) again as arrows $R_H$, $R_V$, and $R_P$. As can be clearly seen, the horizontal reaction force $R_H$ and the vertical reaction force $R_V$ are transferred to the frame 6' of the conventional seat assembly 1', such that the legs 7' of the frame 6' must be designed both to withstand these loads and to transfer them to the floor structure F of the aircraft. Assuming that the average mass of a passenger is 80 kg and the mass of a seat assembly is 10 kg, the maximum forward load applied to the seat frame 6' during the 16 g test would be equivalent to about 1,440 kg.

By adopting a seat belt arrangement of the present disclosure as, for example, in the seat assembly 1 shown in FIGS. 1(*a*) and 1(*b*), however, the maximal forward load applied on the seat frame 6 could potentially be reduced from 1,440 kg to about 160 kg, and this reduction of the maximal load would then allow a corresponding reduction in the size and mass of the frame 6. In other words, the seat belt arrangement and seat assembly 1 of the present disclosure optimize the loading paths and can lead to a significant weight reduction in the seat assembly 1 itself.

Figure 3:
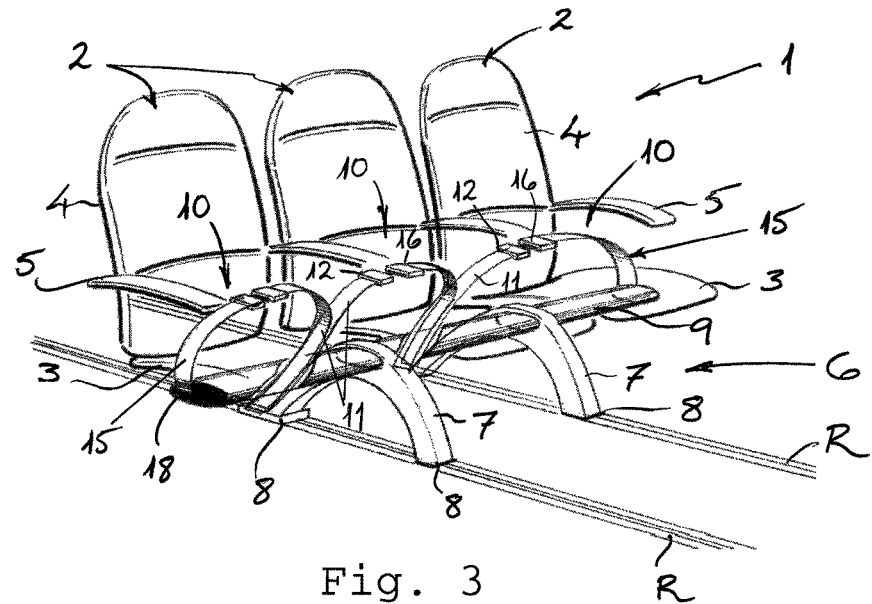
FIG. 3 shows a schematic perspective front view of a seat assembly according to a further embodiment of the disclosure herein.
Figure 4:
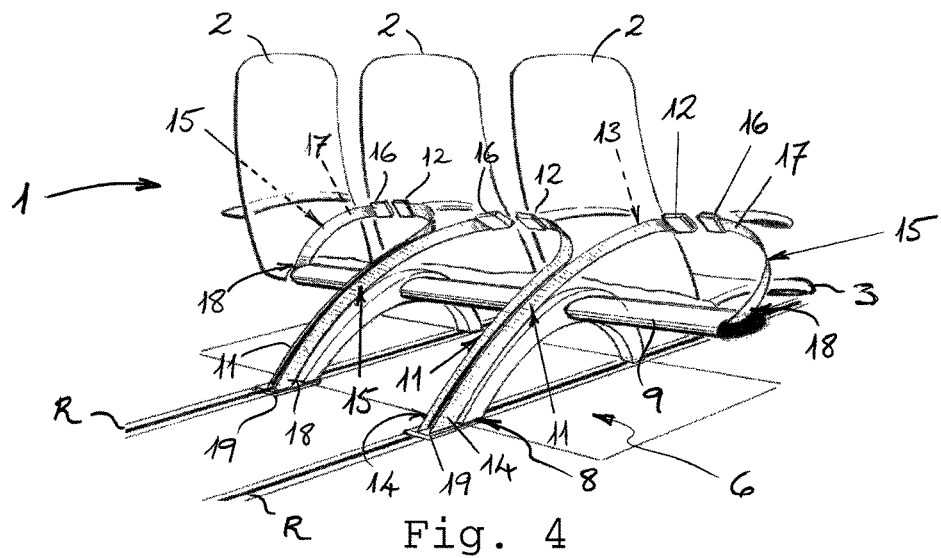
FIG. 4 shows a schematic perspective rear view of a seat assembly according to a further embodiment of the disclosure herein.

With reference now to FIGS. 3 and 4 of the drawings, another preferred embodiment of the seat assembly 1 is illustrated. In this instance, the seat assembly 1 includes three seats 2 arranged side-by-side, with each having a seat pan 3, a back rest 4 and arm rests 5. The seats 2 are mounted and supported on a frame 6 which again includes legs 7 and footings 8 which engage and attach to seat rails R incorporated in the floor structure of the aircraft. In this particular embodiment, the frame 6 also includes a transverse beam 9 which interconnects the legs 7 and carries or supports the seats 2. Furthermore, the seat assembly 1 includes a seat belt 10 associated with each respective seat 2, with each seat belt 10 having a first belt portion 11 and a second belt portion 15 that together extend across a lap of the passenger P seated on the seat 2. In this regard, a buckle fastener element 12 is provided at a first end 13 of the first belt portion 11 and a complementary buckle fastener element 16 is provided at a first end region 17 of the second belt portion 15. Thus, the buckle fastener elements 12, 16 are configured for operation by the passenger P to fasten and to release the seat belt 10 across his or her lap, e.g. in a manner as is known in the art.

In the case of the outer seats, a second end region 14 of the first belt portion 11 extends down to the floor structure F and is anchored at the footing 8 of the frame 6 or in the seat rail R of the floor structure F directly. A second end region 18 of the second belt portion 15, on the other hand, is anchored to the transverse beam 9 of the seat frame 6 next to or adjacent the respective seat pan 3. In the case of the middle seat, on the other hand, the second end 14, 18 of both of the first and second belt portions 11, 15 extends down to the floor structure F and is anchored at the footing 8 of the frame 6 and/or in the seat rail R of the floor structure F directly. In this regard, each of the second ends 14, 18 of the first and second belt portions 11, 15 is provided with an anchor member 19 for rigid or secure attachment to the seat rail R. Thus, the embodiment of FIGS. 3 and 4 also provides loading paths that can provide a significant weight reduction in the seat assembly 1, and specifically in the structure of the frame 6.

It will be appreciated that, in the foregoing description of the seat belt arrangement and seat assembly of the invention, the seat belt itself, i.e. first and second belt portions, will typically comprise a material known and used in the art. Thus, the belt portions will typically comprise flat webbing or straps of woven textile material including, for example, synthetic fibres such as nylon, polypropylene, or polyester, or exceptionally high-strength materials, such as Dyneema™ or Kevlar™. The fastener member and complementary fastener member attached at the first end regions of the belt portions will typically be comprised of a robust material, such as metal, e.g. an aluminium alloy.

Figure 5:
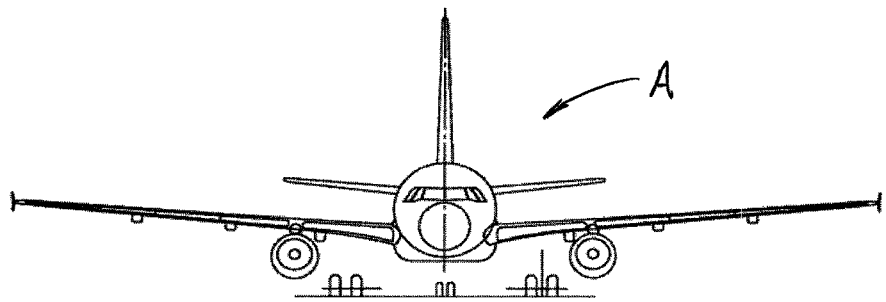
FIG. 5 is a schematic illustration of an aircraft in which one or more seat assembly according to another embodiment of the disclosure herein is installed.

Finally, an aircraft A is shown schematically in FIG. 5 which includes a plurality of seat belt arrangements according to the embodiments described in detail above. In particular, the aircraft A is configured as a commercial passenger aircraft and includes a plurality of seat assemblies 1 according to embodiments of the invention described above with reference to FIGS. 1(*a*) and 1(*b*) and FIGS. 3 and 4.

Although specific embodiments of the invention have been illustrated and described herein, it will be appreciated by those of ordinary skill in the art that a variety of alternate and/or equivalent implementations exist. It should be appreciated that the exemplary embodiment or exemplary embodiments are only examples, and are not intended to limit the scope, applicability, or configuration in any way. Rather, the foregoing summary and detailed description will provide those skilled in the art with a convenient road map for implementing at least one exemplary embodiment, it being understood that various changes may be made in the function and arrangement of elements described in an exemplary embodiment without departing from the scope as set forth in the appended claims and their legal equivalents. Generally, this application is intended to cover any adaptations or variations of the specific embodiments discussed herein.

In this document, the terms "comprise", "comprising", "include", "including", "contain", "containing", "have", "having", and any variations thereof, are intended to be understood in an inclusive (i.e. non-exclusive) sense, such that the process, method, device, apparatus or system described herein is not limited to those features or parts or elements or steps recited but may include other elements, features, parts or steps not expressly listed or inherent to such process, method, article, or apparatus. Furthermore, the terms "a" and "an" used herein are intended to be understood as meaning one or more unless explicitly stated otherwise. Moreover, the terms "first", "second", "third", etc. are used merely as labels, and are not intended to impose numerical requirements on or to establish a certain ranking of importance of their objects.

The invention claimed is:

1. A seat belt arrangement for a seat assembly of an aircraft for securing a passenger in a seat during travel, the seat assembly including a frame upon which the seat is supported, the frame having leas and one or more footings which are arranged between the legs and a floor structure of the aircraft and which contact and attach to the floor structure, the seat belt arrangement comprising:
   a seat belt including at least a first belt portion for extending across a body part of the passenger seated on the seat; and
   a fastener member provided on the first belt portion for operation by the passenger to fasten and to release the seat belt across the body part of the passenger;
   wherein a second end region of the first belt portion is anchored to a footing of the seat assembly or directly to the floor structure of the aircraft.

2. The seat belt arrangement according to claim 1, wherein the second end region of the first belt portion extends to the floor structure of the aircraft or to the footing of the seat assembly in contact with the floor structure.

3. The seat belt arrangement according to claim 1, wherein the second end region of the first belt portion includes an attachment member with which the seat belt is securely fixed or anchored to the footing of the seat assembly or to the floor structure of the aircraft.

4. The seat belt arrangement according to claim 1, wherein the fastener member provided on the first belt portion is configured to cooperate with a complementary fastener member for fastening and releasing the first belt portion across the body part of the passenger seated on the seat.

5. The seat belt arrangement according to claim 4, wherein the seat belt includes a second belt portion which cooperates with the first belt portion for extending across a body part of the passenger seated on the seat, the complementary fastener member being provided on the second belt portion, and wherein a second end region of the second belt portion is anchored at a footing of the seat assembly or at a floor structure of the aircraft directly.

6. The seat belt arrangement according to claim 5, wherein the second end region of the second belt portion extends to the footing of the seat assembly or to the floor structure of the aircraft.

7. The seat belt arrangement according to claim 5, wherein the second end region of the second belt portion comprises an attachment member with which the seat belt is securely fixed or anchored to the footing of the seat assembly or to the floor structure, especially to a seat rail, of the aircraft.

8. An aircraft seat assembly for mounting on a floor structure of an aircraft, comprising:
  at least one seat configured to accommodate and support a passenger during travel;
  a frame upon which the at least one seat is mounted and supported, the frame including legs and one or more footings arranged between the frame and a floor structure of the aircraft and configured for engagement with and attachment to the floor structure; and
  a seat belt respectively associated with each seat and configured to extend across a body part of the passenger seated on the seat, the seat belt including at least a first belt portion and a fastener member provided on the first belt portion for operation by the passenger to fasten and to release the seat belt across the body part of the passenger,
  wherein a second end region of the first belt portion is anchored to the footing or directly to the floor structure of the aircraft.

9. The seat assembly according to claim 8, wherein the second end region of the first belt portion extends to the floor structure of the aircraft or to the footing of the frame contacting the floor structure.

10. The seat assembly according to claim 9, wherein the seat belt includes a second belt portion which cooperates with the first belt portion to extend across a body part of the passenger seated on the seat, wherein a complementary fastener member is provided on the second belt portion to cooperate with the fastener member for fastening and releasing the seat belt across the body part of the passenger seated on the seat, and wherein a second end region of the second belt portion is anchored at the footing of the frame or at the floor structure of the aircraft directly.

11. The seat assembly according to claim 10, wherein the second end region of the second belt portion extends to the footing or the floor structure.

12. An aircraft including at least one aircraft seat assembly for mounting on a floor structure of the aircraft, the aircraft seat assembly comprising:
  at least one seat configured to accommodate and support a passenger during travel;
  a frame upon which the at least one seat is mounted and supported, the frame including leas and one or more footings arranged between the frame and a floor structure of the aircraft and configured for engagement with and attachment to the floor structure; and
  a seat belt respectively associated with each seat and configured to extend across a body part of the passenger seated on the seat, the seat belt including at least a first belt portion and a fastener member provided on the first belt portion, especially at a first end region of the first belt portion, for operation by the passenger to fasten and to release the seat belt across the body part of the passenger,
  wherein a second end region of the first belt portion is anchored to the footing or directly to the floor structure of the aircraft.

13. The seat belt arrangement according to claim 1, wherein the fastener member is provided at a first end region of the first belt portion.

14. The seat assembly according to claim 8, wherein the fastener member is provided at a first end region of the first belt portion.

15. The seat belt arrangement according to claim 3, wherein the attachment member securely fixes or anchors the seat belt to a seat rail in the floor structure.

16. The seat assembly according to claim 9, wherein the attachment member securely fixes or anchors the seat belt to a seat rail in the floor structure.

17. The seat belt arrangement according to claim 7, wherein the attachment member of the second end region of the second belt portion securely fixes or anchors the seat belt to a seat rail of the aircraft.

18. The seat assembly according to claim 11, wherein the attachment member of the second end region of the second belt portion securely fixes or anchors the seat belt to a seat rail of the aircraft.

19. The seat assembly according to claim 8, wherein the second end region of the first belt portion includes an attachment member with which the seat belt is securely fixed or anchored to the footing of the frame or to the floor structure of the aircraft.

20. The seat assembly according to claim 10, wherein the second end region of the second belt portion comprises an attachment member with which the seat belt is securely fixed or anchored to the footing or to the floor structure.

* * * * *